United States Patent [19]

Killpatrick et al.

[11] 4,330,920
[45] May 25, 1982

[54] METHOD FOR MANUFACTURING MAGNETOHYDRODYNAMIC ELECTRODES

[75] Inventors: Don H. Killpatrick, Orland Park; Henry R. Thresh, Palos Heights, both of Ill.

[73] Assignee: The United States of America as represented by the United States Department of Energy, Washington, D.C.

[21] Appl. No.: 162,543

[22] Filed: Jun. 24, 1980

[51] Int. Cl.³ ............................................. B23P 17/04
[52] U.S. Cl. ...................................................... 29/423
[58] Field of Search .......................... 29/423, 424, 599; 72/47; 310/11

[56] References Cited

U.S. PATENT DOCUMENTS

| | | | |
|---|---|---|---|
| 2,434,992 | 1/1948 | Durst | 29/424 X |
| 3,160,951 | 12/1964 | Markert et al. | 29/423 X |
| 3,281,921 | 11/1966 | Danko et al. | 29/423 X |
| 3,291,870 | 12/1966 | Allison | 29/423 |
| 3,342,648 | 9/1967 | Zucker et al. | 148/11.5 |
| 3,514,850 | 6/1970 | Barber et al. | 29/599 |
| 3,579,800 | 5/1971 | Packard | 29/423 |

Primary Examiner—Ervin M. Combs
Attorney, Agent, or Firm—Walter L. Rees; Richard G. Besha; James E. Denny

[57] ABSTRACT

A method of manufacturing electrodes for use in a magnetohydrodynamic (MHD) generator comprising the steps of preparing a billet having a core 10 of a first metal, a tubular sleeve 12 of a second metal, and an outer sheath 14, 16, 18 of an extrusile metal; evacuating the space between the parts of the assembled billet; extruding the billet; and removing the outer jacket 14. The extruded bar may be made into electrodes by cutting and bending to the shape required for an MDH channel frame. The method forms a bond between the first metal of the core 10 and the second metal of the sleeve 12 strong enough to withstand a hot and corrosive environment.

7 Claims, 5 Drawing Figures

METHOD FOR MANUFACTURING MAGNETOHYDRODYNAMIC ELECTRODES

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to a method of preparing a metal bar clad with a second metal so that the metal-metal bond is strong enough to withstand the rigors of a hot and corrosive environment. More specifically, this invention relates to a method for manufacturing an electrode for use in a magnetohydrodynamic generator comprised of a copper core clad with a corrosion-resistant, thermally and electrically conducting metal.

The principle of magnetohydrodynamic power generation utilizes heat to produce a high velocity stream of electrically conducting fluid which is then passed through a magnetic field to convert the kinetic energy of the stream into electrical energy. A typical diagonal window frame MHD power generator is an elongated duct or channel constructed of a large number of open rectangular forms or "window frames" fastened together side-by-side and insulated from each other. Around the inner perimeter of each frame are located a number of individual, generally rectangular, electrodes for collecting the electrical energy generated in each frame by the passage of the high-temperature conductive fluid. Other generator and/or electrode geometries can also be used but in each case a number of electrodes are present and separated from each other by an electrical insulator since some will act as anodes and some as cathodes as the plasma passes through the channel.

The plasma within the channel may reach temperatures of up to 2800° C. resulting in electrode-plasma temperatures of up to 2100° C. The plasma may be a combustion gas or inert gas seeded with a conductor such as potassium. The plasma passes through the duct at a speed which may approach or even exceed the sonic velocity. The plasma environment may be slightly oxidizing depending on the particular medium being used and its source. Thus, it is a problem to find a material from which electrodes can be made which can withstand the rigors of such an environment.

Copper has many of the characteristics required of an electrode for use in a MHD generator. It has a long service life if cooled, very stable thermal conductivity, electrical conductivity and thermal stability, and it has adequate mechanical strength characteristics. It is also inexpensive and is easily worked by common metal working techniques. However, copper can be oxidized at high temperatures and is not chemically resistant to the corrosive coal slag found in a MHD generator channel. Hot slag may condense on the colder copper surface. This solid slag layer will be colder than the plasma and therefore highly resistive. Furthermore, a low-temperature, high-resistance layer of air or corroded copper may form beneath the condensed slag, and this layer may also inhibit the passage of current.

Copper electrodes may be clad with a metal such as platinum or palladium which resists corrosion and oxidation and which has good thermal and electrical conductivity. This requires a method for manufacturing the metal-clad copper bars which will result in a very strong metal-copper bond, without oxidizing or contaminating the copper, and which will be efficient in terms of time and costs. Previously such electrodes were made by brazing or welding a metal such as sheet platinum to elongated copper bars. This method does not provide a strong reliable bond between platinum and copper and thus does not prevent oxidation of the copper layer in the MHD generator channel. This method is also tedious, expensive and time-consuming because electrodes must be manufactured individually. Alternatively, plating platinum onto copper results in a porous platinum surface which is not sufficiently resistant to corrosion. Plating is also expensive.

SUMMARY OF THE INVENTION

It is one object of the invention to provide a method for manufacturing an electrode suitable for use in the environment of a magnetohydrodynamic generator.

It is another object of the invention to provide a method for bonding a first metal to a second metal.

It is yet another object of the invention to provide a method for bonding a corrosion-resistant conductive metal to copper such that the copper is not oxidized during manufacture or MHD generator operation and such that the metal-copper bond is strong enough to withstand a very hot and corrosive environment.

Additional objects, advantages and novel features of the invention will be set forth in part in the following description.

In accordance with the invention, the method of manufacture may comprise the steps of preparing an extrusion billet having a metal core surrounded by a layer of a second metal which is in turn surrounded by an air-tight outer sheath of an extrusile metal, evacuating the sheath to thereby evacuate the spaces between the metal layers of the billet to remove oxygen and other contaminants from all the internal metallic surfaces, extruding the billet to form an elongated bar, and finally removing the outer metal sheath. Under normal extruding conditions, it is also necessary to heat the assembled billet prior to extrusion to soften the metal. Ordinarily this would result in oxidation of the metal core, but in the present invention oxidation is prevented by the evacuation of the spaces between the metal layers of the billet and by the protective outer sheath. The resulting elongated metal bar clad with a second metal may be used to manufacture electrodes for an MHD generator by dividing the bar longitudinally into two or more bars, each having at least one surface clad with the second metal and at least one surface of the exposed metal of core, and cutting these bars into lengths suitable for electrodes.

The exclusion of oxygen and other contaminants from the interior surfaces of the billet prior to extrusion is essential for the formation of a strong bond between the metal core and the sleeve of the second metal. The billet is kept oxygen-free in three ways: deoxidized metals are used whenever possible; non-oxidizing methods of assembling the billet are used, such as welding under an inert atmosphere or vacuum; and the assembled billet is evacuated as just described. These steps promote stronger bonding between the first metal of the core and the second metal of the sleeve and prevent oxidation or other contamination of the billet. The extrusion technique also yields a greater number of electrodes per time and cost than the welding or plating techniques.

DETAILED DESCRIPTION OF THE INVENTION

The following is a detailed description of a preferred embodiment of the invention; other embodiments will be readily apparent to those skilled in the art.

Figure 1:
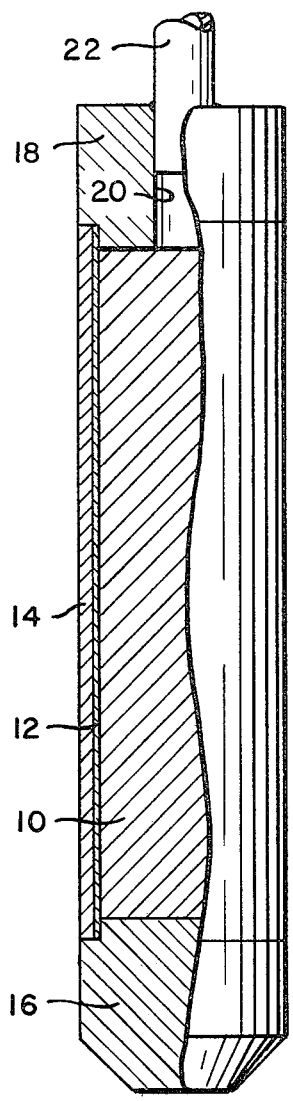
FIG. 1 is an illustration of the assembled billet before extrusion fitted with a means for evacuation, showing a longitudinal cut-away view of the internal structure of the billet.

FIG. 1 shows an assembled billet comprised of a cylindrical metal core 10, surrounded by a tubular sleeve 12 of a second metal, which is in turn surrounded by a jacket 14 of an extrusile metal. Capping the ends of the billet are a nose piece 16 and a tail piece 18, both formed of an extrusile metal.

The tubular sleeve 12 is formed from a sheet of the second metal and fitted over the core. The outer jacket 14 is fitted over the assembled core 10 and sleeve 12, and the nose piece 16 and tail piece 18 are welded into place. Coaxial with the tail piece 18 is a cylindrical hole 20 into which is inserted a tube 22. The billet is evacuated through the evacuation tube 22 to eliminate oxygen and contaminants and the tube 22 is sealed off to the atmosphere. In some cases the billet may be heated for several hours prior to extrusion to soften the metal. Finally, the billet is extruded through a die. After cooling, the outer jacket 14 is stripped from the extruded bar.

The extruded bar may be used to manufacture electrodes for use in MHD generators. In this application the inner core 10 should be a metal that is strong, stable, and thermally and electrically conductive, such as copper. The tubular sleeve 12 should be a metal that is corrosion-resistant, metallurgically compatible with the core metal, and thermally and electrically conductive, such as platinum or palladium. The outer sheath 14, nose piece 16 and tail piece 18 may be made of any readily available extrusile metal that is easily stripped with acid, such as copper. Deoxygenated metals are used for the copper core 10, outer jacket 14, nose piece 16 and tail piece 18 so that the metals will not be a source of oxygen.

The strength of the bond between the metal core 10 and the sleeve of the second metal 12 depends upon the exclusion of oxygen and contaminants from the interior surfaces of the billet prior to extrusion. Evacuation ensures the removal of oxygen and contaminants which may accumulate in the spaces between the metallic surfaces during the assembly of the billet.

Figure 2:
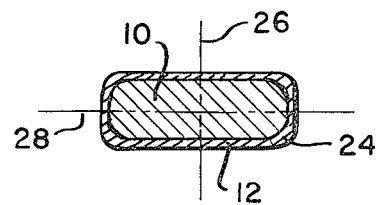
FIG. 2 is an illustration of a longitudinal cross-section of the extruded bar showing the inner copper core, the cladding of corrosion-resistant metal, a slight buildup of the cladding metal along the edge of the bar, and the lines along which the bar may be cut to make MHD electrodes.

Referring to FIG. 2, it is seen that drawing a billet of circular cross-section through a rectangular die results in a buildup 24 of the metal of the tubular sleeve 12 along the edges of the bar. Cold metal electrodes generally operate in the arcing mode in an MHD channel giving rise to considerable metal loss, either directly by evaporation of the metal or indirectly by oxide formation. If the arc becomes stationary at the edge, removal of metal will be rapid and holes may be produced in electrodes all the way to the water coolant passages. The buildup of platinum along the edges of the bar thus provides extra protection to the electrode exactly where it is needed most.

Figure 3:
FIG. 3 is an illustration of a longitudinal cross-section of a finished electrode showing two exposed adjoining surfaces of copper, two adjoining surfaces clad with a corrosion-resistant metal and a slight buildup of the cladding metal along the edge adjoining the two clad surfaces.
Figure 4:
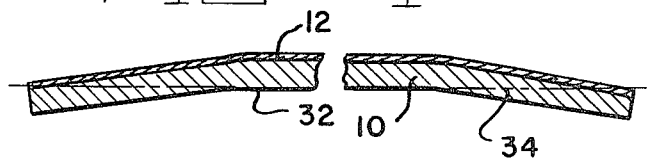
FIG. 4 illustrates how an electrode may be deformed and slit again if a non-rectangular shape is desired.
Figure 5:
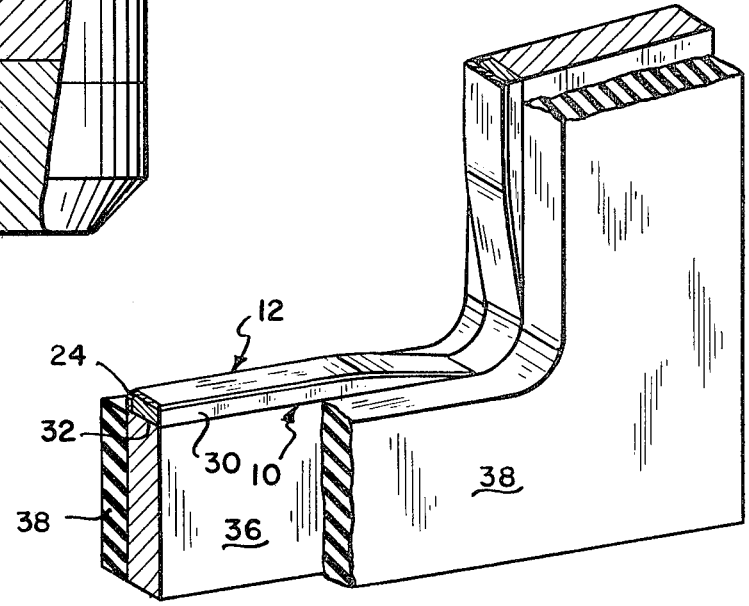
FIG. 5 illustrates the finished electrode mounted on an insulated corner of a MHD channel frame.

Electrodes can be manufactured from the extruded bars by cutting them into convenient lengths and slitting them longitudinally so that one or more surfaces of exposed core material can be mounted against an MHD channel frame. FIG. 2 illustrates a cross-section of an extruded bar showing planes 26 and 28 along which the bar may be slit to manufacture an electrode. FIG. 3 shows a cross-section of an electrode which has been manufactured in this manner from an extruded bar. Slicing the bar longitudinally along planes 26 and 28 exposes the surfaces 30 and 32 of the inner core 10. In one embodiment of the invention illustrated in FIG. 4, the electrode may be bent or deformed as desired and slit again along a plane 34 to produce an electrode which conforms to the design of a particular MHD channel frame. FIG. 5 illustrates an electrode manufactured as in FIG. 4 mounted on an MHD channel frame 36 surrounded by insulators 38. The plasma flows over the sleeve 12 and does not touch the surfaces 30 and 32 of the core 10, thus the core 10 is protected from corrosion.

The following example is given as illustrative of the method of the invention and is not to be taken as limiting the scope which shall be defined by the appended claims.

EXAMPLE I

A core is prepared of oxygen-free high conductivity (OFHC) copper which may contain silver in the quantity of up to 25 ounces per ton. OFHC copper is used to eliminate oxygen which would interfere with the formation of the bond between the core and the platinum sleeve. The small amount of silver in the core imparts higher stability to the copper to reduce creep and recrystallization and to improve the compatibility of the copper with the frame in the MHD generator channel. The length of the cylinder is 2-3 times the diameter of its base. The core is plated with 0.0003" gold to protect the copper surface from contamination and physical abuse during handling. Gold is used because it is metallurgically compatible with both copper and platinum, forming solid solutions with no extraneous phases during extrusion.

A platinum sheet is carefully sized to ensure the closest possible fit over the copper core. The sheet is roll-formed into an open-ended cylinder and the two edges are welded together by the tungsten inert gas technique (TIG welded) to prevent introduction of oxygen into the weld. The platinum sleeve is annealed at 900° C. for one hour to soften the metal and drawn to proper size. After both the platinum sleeve and the gold plated copper core have been thoroughly cleaned and dried, the sleeve is fitted over the core.

Phosphorus deoxidized copper is used for the outer jacket and the nose and tail pieces. This avoids the introduction of oxygen into the core assembly during heating and extrusion and is less expensive than OFHC copper. The copper jacket is fitted over the core assembly. The nose piece and tail piece are electron beam welded to the core assembly in a vacuum of $10^{-5}$ mm Hg. Electron beam welding is used because the high-vacuum conditions required prevent contamination by oxygen and other impurities, and because the high energy intensity of the beam is well-suited to welding copper.

In this example there is a cylindrical hole coaxial with the tail piece. Inserted partway in the hole is an evacuation tube which extends past the end of the tail piece. Following the electron beam welding of the nose and tail pieces to the assembly, the billet is evacuated through the evacuation tube at $10^{-5}$ mm Hg at 300° C. for 8 hours. This step removes the last traces of oxygen and other gases from the metallic surfaces which might interfere with the formation of the platinum-copper bond during extrusion. After the evacuation step, the portion of the evacuation tube which extends out of the tail piece is hot forged and welded together at some convenient point close to the tail piece. The excess tubing is cut off and the swaged joint is TIG welded as a precaution against leaking.

The assembled billet is heated at 800°–850° C. for four hours to soften the metal in preparation for the extrusion. The billet is then extruded at a 15:1 ratio through a rectangular die to form a bar approximately 7% greater than the final diameter desired. Preferably, less than 1 day should elapse between the time the nose and tail piece are electron beam welded to the billet and the time of the extrusion, to reduce the chance of oxidation or contamination of the billet. The extrusion procedure is typical and could readily be done by one skilled in the art.

After cooling, the ends of the extruded bar are x-rayed to locate the ends of the platinum sleeve. The copper extending beyond the ends of the platinum sleeve is cut off. The outer copper jacket is removed by immersing the extruded billet in a solution of 1:1 $HNO_3$. Finally the extruded bar is reduced to final size and straightened by drawing through a die.

The bars are slit longitudinally along two perpendicular planes such that each plane bisects two opposite surfaces of the bar. This results in four equivalent rectangular bars such that each bar has two adjoining platinum clad surfaces and two adjoining copper surfaces. The slit bars are then deformed and slit again to give electrodes suited to a particular MHD channel frame design.

The foregoing description of a preferred embodiment is not intended to limit the invention to the precise form disclosed. Obviously many modifications and variations are possible in light of the above teaching. For example, other metals such as nickel may be used for the nose piece, tail piece and extrusion jacket, or an alternative means of evacuating the assembled billet may be used, or other corrosion-resistant metals may be substituted for the platinum sleeve. The embodiment was chosen and described in order to best explain the principles of the invention and its practical application.

The embodiments of the invention in which an exclusive property or privilege is claimed are defined as follows:

1. A method of manufacturing a MHD electrode comprising:
   providing a billet comprising a high-purity copper core, a thin layer of gold plated onto the core, a tubular sleeve of platinum or palladium surrounding the core such that the core and sleeve form an interface, and a sheath of copper covering the entire sleeve and core,
   sealing the billet by non-oxidizing welding methods,
   degassing the billet at elevated temperatures,
   heating the billet to extrusion temperature,
   extruding the billet to form a bar whereby the sleeve and core bind together as a solid solution at the interface,
   removing the copper sheath, and
   cutting the extruded bar to expose at least one surface of the copper core, the cut bar being suitable for use as a MHD electrode.

2. The method of claim 1 wherein the degassing is carried out at about 300° C. to a pressure less than or equal to about $10^{-5}$ mm Hg for about 8 hours.

3. The method of claim 2 wherein the method of sealing the billet may include electron beam welding or tungsten-inert gas welding.

4. The method of claim 3 wherein the extrusion temperature is at least 800° C. and the reduction ratio is about 15:1.

5. The method of claim 4 wherein the core consists of oxygen-free high-conductivity copper.

6. The method of claim 5 wherein the sheath consists of phosphorus deoxidized copper.

7. A method for manufacturing a MHD electrode comprising:
   providing a billet comprising a high-purity copper core, a thin layer of gold plated onto the core, a tubular sleeve of platinum or palladium surrounding the core such that the core and sleeve form an interface, and a sheath of copper covering the entire sleeve and core,
   sealing the billet by non-oxidizing welding methods,
   degassing the billet at elevated temperatures,
   heating the billet to extrusion temperature,
   extruding the billet through a rectangular die to form a bar whereby the sleeve and core bind together as a solid solution at the interface, and resulting in a build-up of the sleeve metal along the edges of the bar,
   removing the copper sheath, and
   cutting the extruded bar to expose at least one surface of the copper core, the cut bar being suitable for use as a MHD electrode.

* * * * *